United States Patent
Thirunarayana et al.

(10) Patent No.: US 10,501,293 B2
(45) Date of Patent: Dec. 10, 2019

(54) METHOD OF APPLYING BRAKE TO A HOIST BY ELECTROMAGNETIC MEANS IN A PERMANENT MAGNET MOTOR

(71) Applicant: GOODRICH AEROSPACE SERVICES PRIVATE LIMITED, Bangalore, Karnataka (IN)

(72) Inventors: Ashok Kumar Thirunarayana, Karnataka (IN); Adishesha Chinknyakanhalli Sivaramasastry, Karnataka (IN)

(73) Assignee: GOODRICH AEROSPACE SERVICES PRIVATE LIMITED, Bangalore, Karntaka (IN)

( * ) Notice: Subject to any disclaimer, the term of this patent is extended or adjusted under 35 U.S.C. 154(b) by 291 days.

(21) Appl. No.: 15/471,452

(22) Filed: Mar. 28, 2017

(65) Prior Publication Data

US 2018/0215592 A1    Aug. 2, 2018

(30) Foreign Application Priority Data

Jan. 31, 2017    (IN) .............................. 201741003585

(51) Int. Cl.
*B66D 1/48* (2006.01)
*B66D 1/12* (2006.01)
(Continued)

(52) U.S. Cl.
CPC .............. *B66D 1/485* (2013.01); *B66D 1/12* (2013.01); *B66D 1/22* (2013.01); *H02P 3/04* (2013.01);
(Continued)

(58) Field of Classification Search
CPC . B66D 1/12; B66D 1/22; B66D 1/485; B66D 2700/025; B66D 2700/03; H02P 3/04; H02P 3/08; H02P 3/24
See application file for complete search history.

(56) References Cited

U.S. PATENT DOCUMENTS

| | | | |
|---|---|---|---|
| 3,971,971 A | 7/1976 | Wycoff | |
| 4,030,007 A * | 6/1977 | Price | H02P 3/24 |
| | | | 318/744 |

(Continued)

FOREIGN PATENT DOCUMENTS

| | | |
|---|---|---|
| CN | 103066897 B | 10/2015 |
| DE | 102012013527 A1 | 1/2014 |

(Continued)

OTHER PUBLICATIONS

European Search Report for Application No. 18152827.4-1202; dated Jun. 28, 2018; 4 pgs.

(Continued)

*Primary Examiner* — Emmanuel M Marcelo
(74) *Attorney, Agent, or Firm* — Cantor Colburn LLP

(57) ABSTRACT

Embodiments herein relate to a permanent magnet (PM) motor driven hoist with a motor based electromagnetic brake. The hoist includes a direct current (DC) power source, a PM motor having stator coils and a PM rotor operably coupled to a cable drum with a cable wrapped thereon. The hoist also includes a controller operably connected to the direct current power source and the PM motor, wherein the controller is configured to control the PM motor employing a method to brake the PM motor. The method includes generating control signals in the controller based on a position of the PM motor, applying a braking command signal to the PM motor to magnetically lock the PM rotor of the PM motor for a selected duration, removing the braking (Continued)

command signals for a second selected duration, and repeating the generating, applying, and removing until the PM motor has stopped.

17 Claims, 6 Drawing Sheets

(51) Int. Cl.
    *B66D 1/22*     (2006.01)
    *H02P 3/04*     (2006.01)
    *H02P 3/08*     (2006.01)
    *H02P 3/24*     (2006.01)

(52) U.S. Cl.
    CPC ............... *H02P 3/08* (2013.01); *H02P 3/24* (2013.01); *B66D 2700/025* (2013.01); *B66D 2700/03* (2013.01)

(56) References Cited

U.S. PATENT DOCUMENTS

| | | | |
|---|---|---|---|
| 4,636,962 A | | 1/1987 | Broyden et al. |
| 5,077,508 A | * | 12/1991 | Wycoff ............. B66B 1/308 |
| | | | 187/292 |
| 5,343,134 A | * | 8/1994 | Wendt ............. G01L 5/284 |
| | | | 318/362 |
| 5,692,733 A | | 12/1997 | Hiramatsu |
| 6,460,828 B1 | * | 10/2002 | Gersemsky ........ A61G 7/1042 |
| | | | 254/267 |
| 6,614,198 B2 | | 9/2003 | Vaisanen |
| 7,862,009 B2 | | 1/2011 | Folk et al. |
| 9,422,139 B1 | | 8/2016 | Bialkowski et al. |
| 2001/0045331 A1 | * | 11/2001 | Hikari ............. F16D 55/22655 |
| | | | 188/161 |
| 2006/0284581 A1 | | 12/2006 | Mullin et al. |
| 2010/0039054 A1 | * | 2/2010 | Young ............. B60L 7/26 |
| | | | 318/376 |
| 2015/0047426 A1 | * | 2/2015 | Ekholm ............. B66D 5/30 |
| | | | 73/121 |

FOREIGN PATENT DOCUMENTS

| | | |
|---|---|---|
| EP | 2320556 A2 | 5/2011 |
| JP | S579278 A | 1/1982 |
| JP | 2013240195 A | 11/2013 |

OTHER PUBLICATIONS

English Abstract for DE102012013527A1—Jan. 9, 2014; 2 pgs.
English Translation for CN103066897B—Oct. 28, 2015; 1 pg.
Title: "Dynamic Braking for Hoists"; Authors: Thomas Barkand an William Helfrich; U.S. Dept. of Labor, Mine Safety and Health Administration; PlantServices; Jan. 19, 2006; 11 pgs.
Title: "Emergency Equipment Description and Operation"; MD Helicopters, Inc.; Rotorcraft Maintenance Manual; CSP-900RMM-2; 25-60-10; Revision 17; Copyright 1999-2015 by MD Helicopters, Inc.; 4 pgs.

* cited by examiner

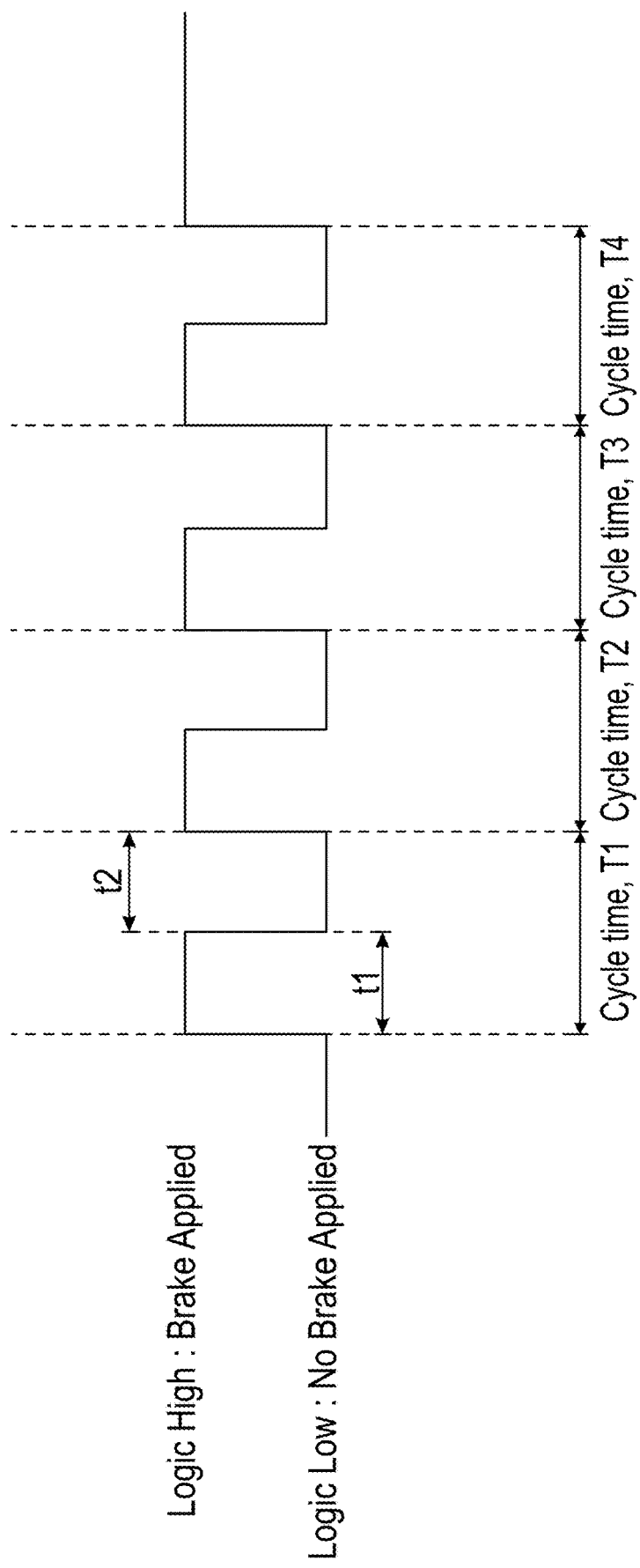

METHOD OF APPLYING BRAKE TO A HOIST BY ELECTROMAGNETIC MEANS IN A PERMANENT MAGNET MOTOR

CROSS REFERENCE TO RELATED APPLICATIONS

This application claims priority to India Patent Application No. 201741003585 filed Jan. 31, 2017, the entire contents of which is incorporated herein by reference.

TECHNICAL FIELD

The invention relates to alternative braking schemes for electrically operated hoists, in particular, rescue hoists employing Brushless Direct Current BLDC motors.

BACKGROUND

Helicopter rescue hoists are used for search and rescue operation of people under emergency situations, for example, evacuation from fire, mid sea, crevasses, land mass, mines and so on under natural calamities or human operational scenarios. In such situations, the hoist needs to be controlled for reel-in/reel-out modes very accurately and reliably, to ensure that a person being rescued is not injured or payload is not damaged. The reliable usage of an electrically powered hoist may be dependent on the efficiency and reliability of the braking systems. The braking mechanism holds the hoist in a fixed position when the motor driving it is not powered. During such operations of a hoist, there could be chances of jerking the payload or even free fall should the braking mechanism become inoperative. In conventional hoist operation, brake function is provided through separate electromechanical means. Some hoist systems have even been equipped with two independent brakes, one of which is known as mechanical load brake and the other a spring set, electrically releasable, friction brake generally referred to as holding brake. A mechanical load brake is a device wherein friction surfaces are brought into engagement by means of torque derived from the suspended load in a manner to retard and stop the descent of said load. The frictional surfaces tend to be released from engagement by torque from the motor in the lowering direction. However, if the motor torque is then removed such as through a power supply failure, the brake would stop and hold the load. The load brake is typically disengaged during hoisting by a clutching mechanism. In operation, each of these brake types are designed to stop and hold any load within the capacity of the hoist. However, use of load and holding brakes is more complex and requires additional weight. The additional weight, in an aircraft application, is undesirable.

While it has long been recognized that a dual braking system where each brake was effective in the event of power failure was a highly desirable feature, several types of hoists have omitted using a mechanical load brake and relied on other schemes for braking when needed. One approach that has been employed is to use electromagnetic motor braking as the second braking means. The phenomenon of electromagnetic braking is a well-known characteristic of motors where they are controlled to operate like a generator, yet also provide a braking torque. On hoists powered from a direct current source, it is quite simple to connect the direct current drive motor such that it becomes a self-excited generator and, thus, provides the second source of braking in the absence of external power. On alternating current powered hoists, while possible, the feature is more complex and as a result, more costly to attain. Finally, it should be noted that electromagnetic braking in any form, since it depends on rotation to develop torque, would not always hold a suspended load stationary. As a result, it at best provides controlled lowering of the load, fortunately at a speed often below the normal lowering speed, and therefore can be advantageous, especially compared to an uncontrolled free falling of a hoist load. Therefore, it would be desirable to have an alternative means of providing braking for the hoist that takes advantage of electromagnetically braking of the hoist motor, resulting in faster and more accurately controlled stopping action, particularly should the conventional electromagnetic brake become inoperative.

BRIEF DESCRIPTION

According to one embodiment of the invention, described herein is a permanent magnet (PM) motor driven hoist with a motor based electromagnetic brake. The hoist includes a direct current (DC) power source, a PM motor having stator coils and a PM rotor operably coupled to a cable drum with a cable wrapped thereon, and a controller operably connected to the direct current power source and the PM motor, wherein the controller is configured to control the PM motor employing a method to brake the PM motor. The method includes generating control signals in the controller based on a position of the PM motor, applying a braking command signal to the PM motor to magnetically lock the PM rotor of the PM motor for a selected duration, removing the braking command signals for a second selected duration, and repeating the generating, applying, and removing until the PM motor has stopped.

In addition to one or more of the features described above, or as an alternative, further embodiments may include a gear train operably coupled to the PM motor and the cable drum.

In addition to one or more of the features described above, or as an alternative, further embodiments may include an electromechanical brake operably coupled to the controller and the cable drum.

In addition to one or more of the features described above, or as an alternative, further embodiments may include that the electromechanical brake is energized when the PM motor is not commanded to move by the controller.

In addition to one or more of the features described above, or as an alternative, further embodiments may include that the electromechanical brake is energized when the PM motor is commanded to move by the controller.

In addition to one or more of the features described above, or as an alternative, further embodiments may include that the electromechanical brake is configured to arrest the motion of the cable drum and hold the cable drum in a fixed position under selected conditions.

In addition to one or more of the features described above, or as an alternative, further embodiments may include a plurality of Hall effect sensors configured to detect the position of a rotor of the PM motor.

In addition to one or more of the features described above, or as an alternative, further embodiments may include the PM motor is a brushless direct current BLDC motor.

In addition to one or more of the features described above, or as an alternative, further embodiments may include that the controller includes an inverter for generating command signals to the PM motor.

In addition to one or more of the features described above, or as an alternative, further embodiments may include that the inverter includes at least six switching devices arranged in three legs.

In addition to one or more of the features described above, or as an alternative, further embodiments may include that the braking command signals are pulse width modulated (PWM) based on an operational characteristic of the PM motor.

According to one embodiment of the invention, described herein is a method of applying a brake in a hoist system with an permanent magnet (PM) motor operably connected to a cable drum with a cable wrapped thereon, a controller operably connected the PM motor and a direct current power source, the controller executing the method. The method including generating control signals in the controller based on a position of the PM motor, applying a braking command signals to the BLDC motor to magnetically lock the PM motor for a selected duration, removing the braking command signals for a second selected duration, and repeating the generating, applying and removing until the PM motor has stopped.

In addition to one or more of the features described above, or as an alternative, further embodiments may include energizing an electromechanical brake when the PM motor is not commanded to move by the controller, wherein the electromechanical brake is configured to arrest the motion of the cable drum and hold the cable drum in a fixed position under selected conditions.

In addition to one or more of the features described above, or as an alternative, further embodiments may include energizing an electromechanical brake when the PM motor is commanded to move by the controller, wherein the electromechanical brake is configured to arrest the motion of the cable drum and hold the cable drum in a fixed position under selected conditions.

Additional features and advantages are realized through the techniques of the present disclosure. Other embodiments and aspects of the disclosure are described in detail herein. For a better understanding of the disclosure with the advantages and the features, refer to the description and to the drawings.

BRIEF DESCRIPTION OF THE DRAWINGS

The subject matter which is regarded as the invention is particularly pointed out and distinctly claimed in the claims at the conclusion of the specification. The foregoing and other features, and advantages of the invention are apparent from the following detailed description taken in conjunction with the accompanying drawings in which:

FIG. 6 depicts a timing diagram depicting the cycle time in accordance with an embodiment.

DETAILED DESCRIPTION

Figure 1:
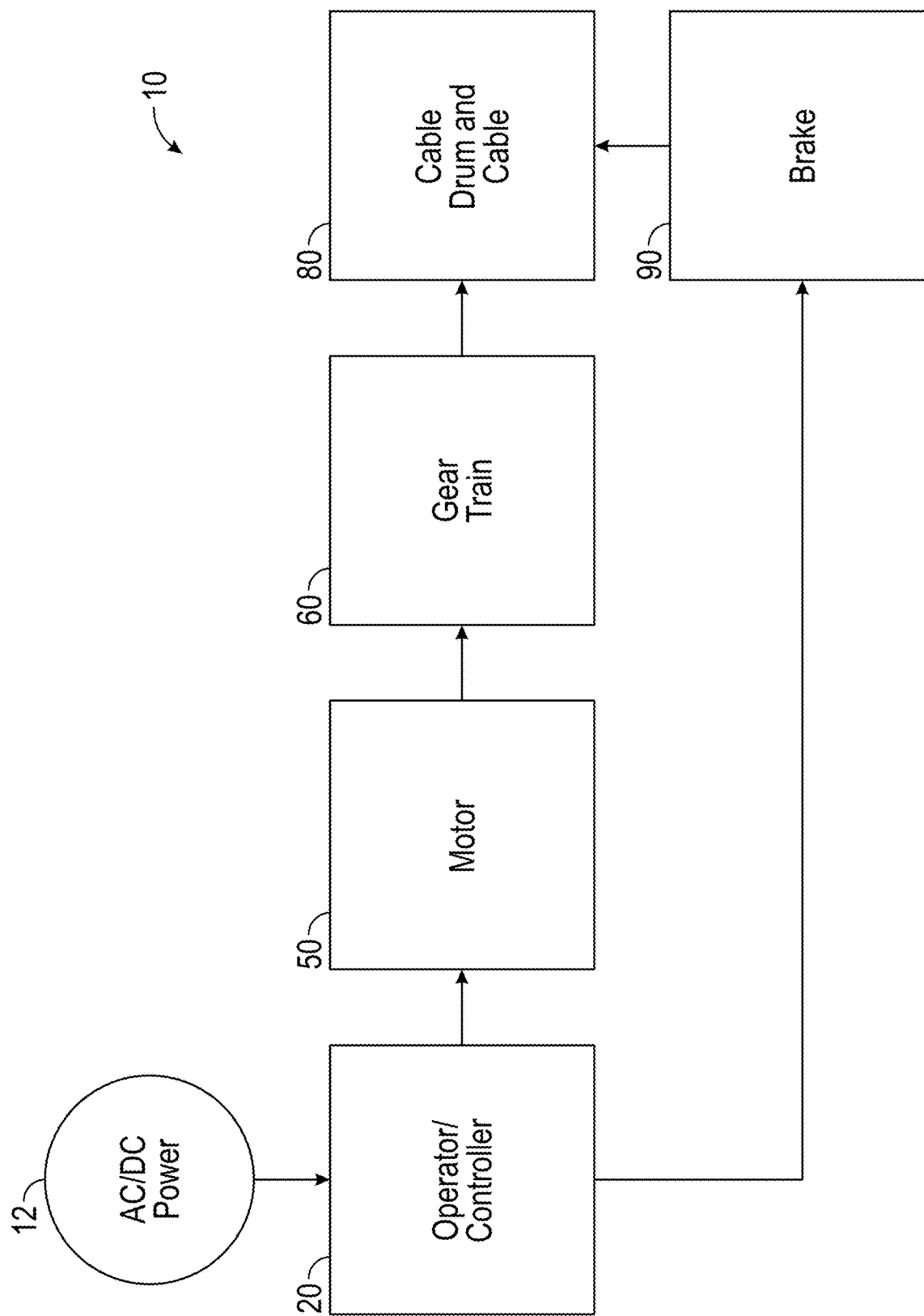
FIG. 1 illustrates a block diagram of a conventional rescue hoist system.

For the purposes of promoting an understanding of the principles of the present disclosure, reference will now be made to the embodiments illustrated in the drawings, and specific language will be used to describe the same. It will nevertheless be understood that no limitation of the scope of this disclosure is thereby intended. The following description is merely illustrative in nature and is not intended to limit the present disclosure, its application or uses. It should be understood that throughout the drawings, corresponding reference numerals indicate like or corresponding parts and features. As used herein, the term controller refers to processing circuitry that may include an application specific integrated circuit (ASIC), an electronic circuit, an electronic processor (shared, dedicated, or group) and memory that executes one or more software or firmware programs, a combinational logic circuit, and/or other suitable interfaces and components that provide the described functionality.

Additionally, the term "exemplary" is used herein to mean "serving as an example, instance or illustration." Any embodiment or design described herein as "exemplary" is not necessarily to be construed as preferred or advantageous over other embodiments or designs. The terms "at least one" and "one or more" are understood to include any integer number greater than or equal to one, i.e. one, two, three, four, etc. The terms "a plurality" are understood to include any integer number greater than or equal to two, i.e. two, three, four, five, etc. The term "connection" can include an indirect "connection" and a direct "connection".

As shown and described herein, various features of the disclosure will be presented. Various embodiments may have the same or similar features and thus the same or similar features may be labeled with the same reference numeral, but preceded by a different first number indicating the figure to which the feature is shown. Thus, for example, element "a" that is shown in Figure X may be labeled "Xa" and a similar feature in Figure Z may be labeled "Za." Although similar reference numbers may be used in a generic sense, various embodiments will be described and various features may include changes, alterations, modifications, etc. as will be appreciated by those of skill in the art, whether explicitly described or otherwise would be appreciated by those of skill in the art.

In general, embodiments herein relate generally to an aircraft rescue hoist system, and more particularly to a motor-based hoist braking system for the hoist that is provided either in lieu of or in addition to an electromechanical braking mechanism.

FIG. 1 illustrates a block diagram of a conventional rescue hoist system 10. In normal operation, an operator by way of a controller 20 applies power 12 to a motor 50. The motor 40 drives a gear train 60, which is used to spin the drum 80 with a cable wound thereon for reeling in/out operations. Application of a brake 90 ensures that a hoist payload is prevented from freely moving when the motor 50 is not energized.

Figure 2:
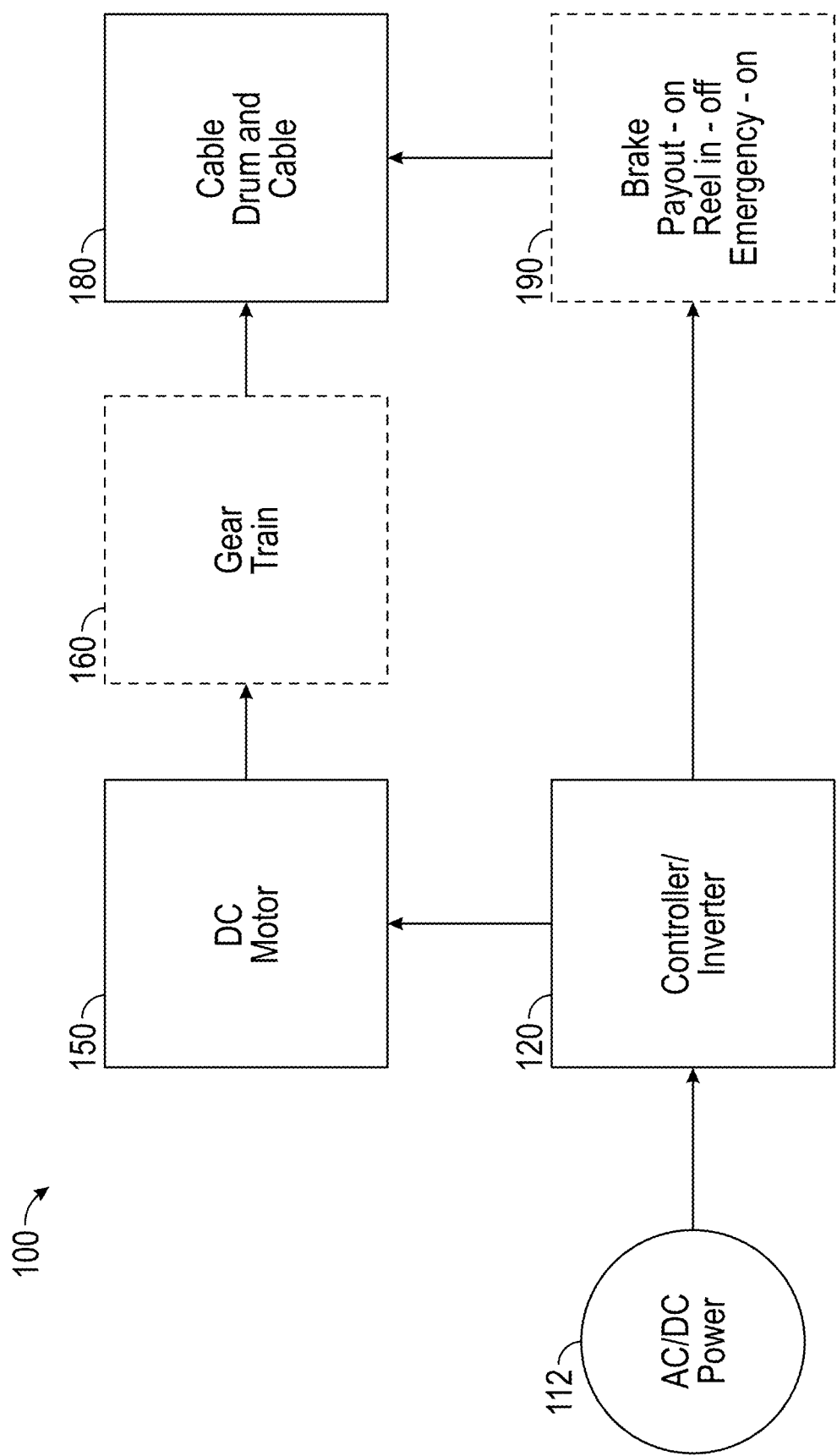
FIG. 2 illustrates a block diagram of the rescue hoist system in accordance with an embodiment.

FIG. 2 illustrates a block diagram of the rescue hoist system 100 in accordance with an embodiment. In normal operation, an operator by way of a controller 120 applies a set of command signals to a motor 150. In an embodiment, a Permanent Magnet motor is employed. In other embodiments the PM motor can be a Brushless DC (BLDC) motor a Permanent Magnet Synchronous Motor (PMSM) or Reluctance motors are employed. The motor 150 drives an optional gear train 160, which is used to spin the drum 180 holding a spool of cable for reeling in/out operations. In some embodiments, the gear train 160 may not be employed and the BLDC motor 150 directly drives the drum 180 and cable. In some embodiments, a brake 190 ensures that the drum 180 and thereby the hoist payload is prevented from freely moving (up or down) under certain operating conditions. For example, in an embodiment the brake 190 ensures that the hoist system does not freely move when the motor 150 is not energized. The brake 190 is electromechanical and applied based on a control signal 122 (See FIG. 4) from the controller 120 such that the cable payload does not move or fall freely. In other embodiments, the brake 190 is not employed and the braking is provided by the motor 150 using regenerative or plugging type braking. Moreover, in other embodiments, the braking is provided by both the motor 150 and the electromechanical brake 190 as desired.

Figure 3:
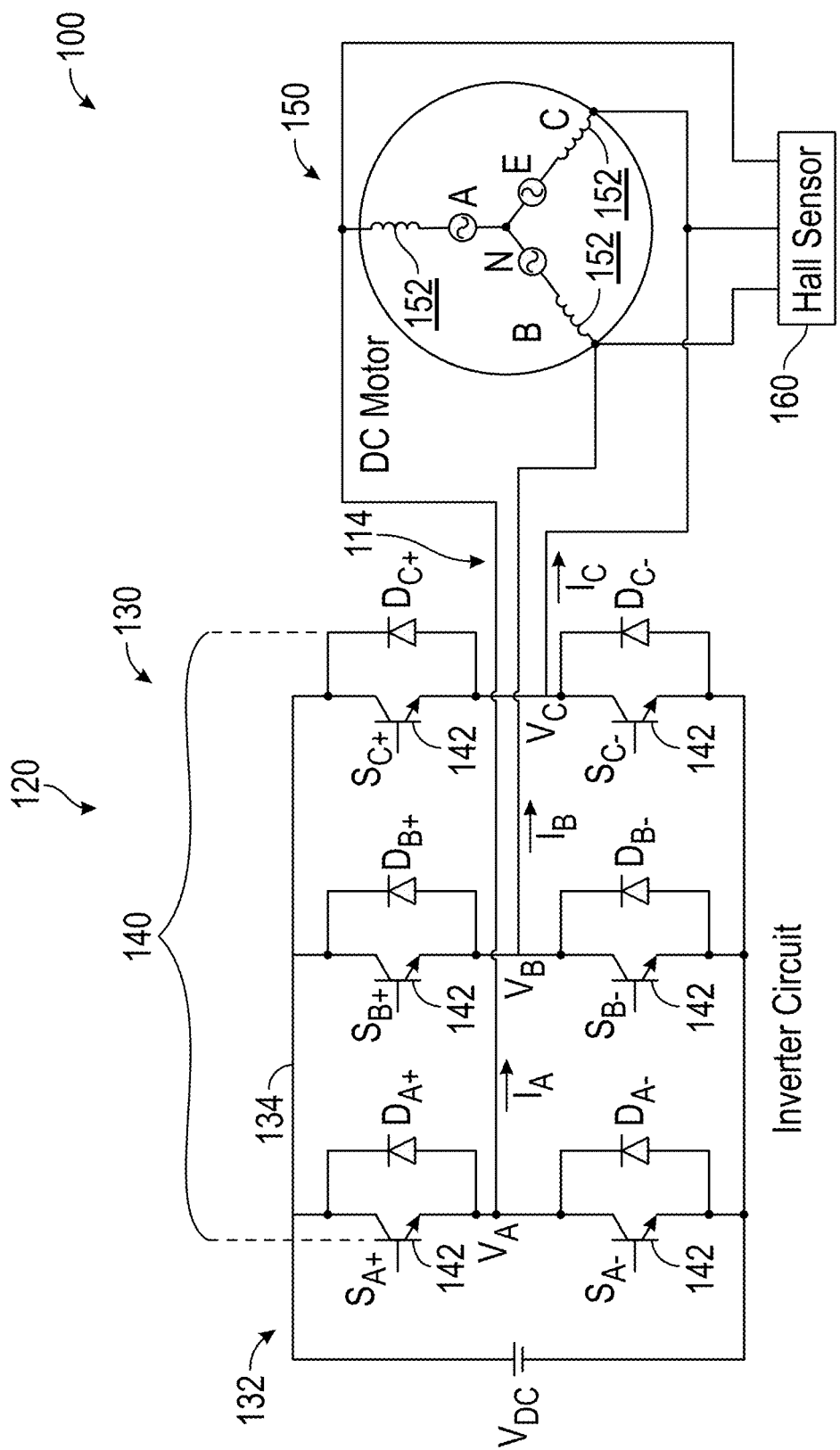
FIG. 3 illustrates a portion of the rescue hoist system according to an embodiment.

Referring now to FIG. 3 as well, the controller 120 includes a motor drive 130. In an embodiment, the motor drive 130 includes a direct current (DC) power supply 132 and an inverter 140, each connected to a DC bus 134. The inverter 140 provides excitation signals to the motor 150 in a conventional manner based on control inputs from the operator. The DC power supply 132 could be as simple as a battery or a passive rectifier connected to an alternating current (AC) power source and energy storage. In another embodiment, the DC power supply 132 includes an active front end converter for converting AC power to supply the DC bus 134. It will be appreciated that while one motor drive 130 with a single inverter 140 is disclosed with respect to an embodiment, multiple drives 130 operating in a parallel fashion may also be employed. In an alternative embodiment separate drives 130 and/or inverter(s) 140 may be employed to control a plurality of windings, or a portion thereof of the motor 150. The drive, (or multiple drives) 130, may be controlled by one or more separate controllers, 120, respectively.

Continuing with FIG. 3, in an embodiment the inverter 140 has 3 phase legs, A, B, and C. Each phase leg, A, B, and C, includes switching devices 142 controlled by control signals from a controller 120 in a conventional manner such as a pulse width modulation PWM scheme to convert DC power across the DC bus 134 to AC drive signals 144 to power motor 150. In an embodiment, the inverter 140 employs at least six switching devices 142 in three separate parallel legs.

Figure 4:
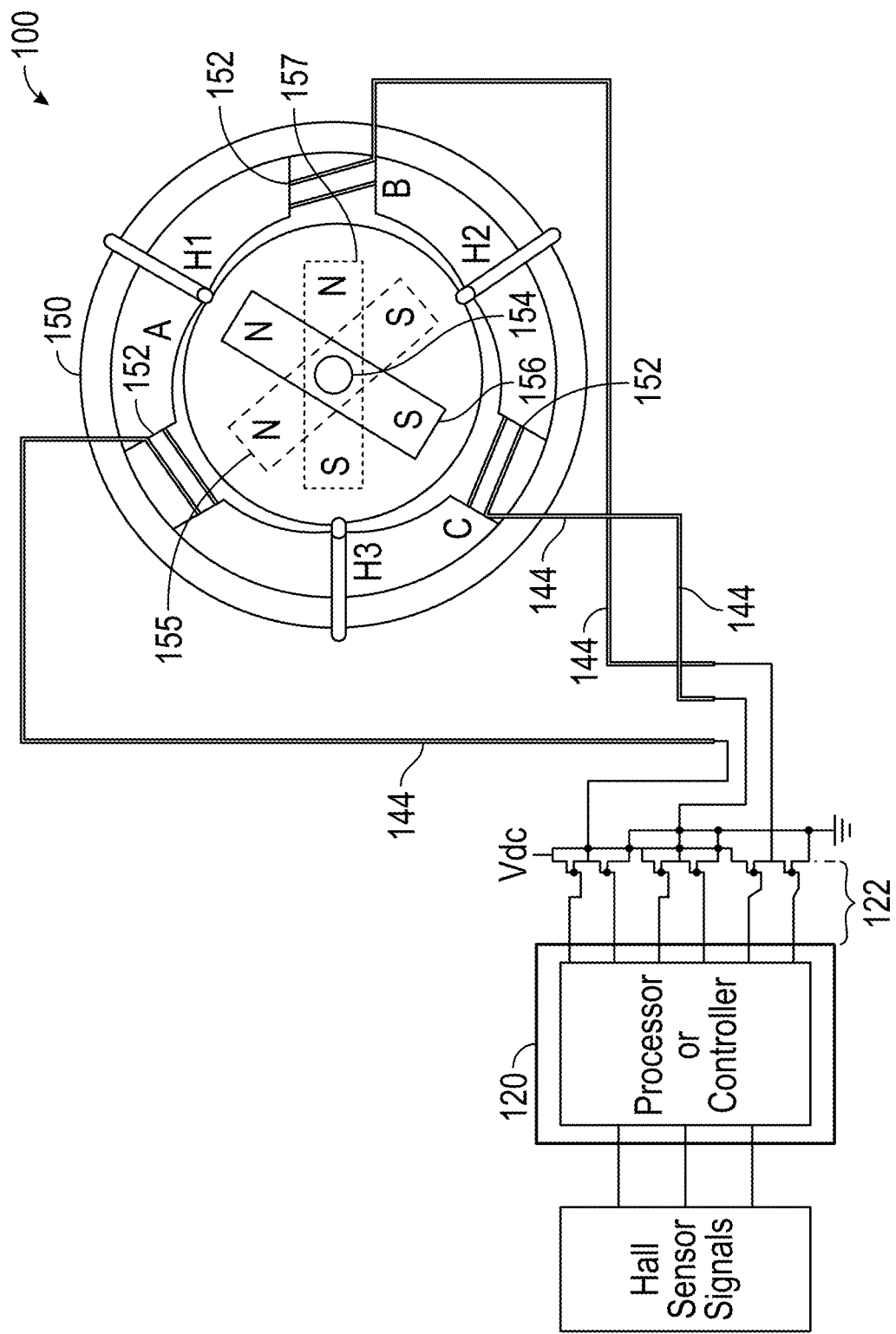
FIG. 4 illustrates a portion of the rescue hoist system depicting the motor in operation and magnetically locked according to an embodiment.

Referring now to FIGS. 3, and 4, in an embodiment, a sensor 160 detects an operating characteristic of the motor 150, for example, motor speed, torque and the like, may be measured or computed. The controller 120 (FIG. 2) employing a pulse width modulation (PWM) function receives the operating characteristic, in this instance rotor positions from the sensors 160 and generates corresponding PWM control signals 122 (See FIG. 4) to drive the gates of the switching devices 142 of the inverter 140. Drive controller 120 provides control signals 122 to the switching devices 142 of the inverter 140 to control generation of the drive signals 144 to motor 150. Controller 120 may be implemented using a general-purpose microprocessor executing a computer program stored on a storage medium to perform the operations described herein. Alternatively, drive controllers 120 may be implemented in hardware (e.g., ASIC, FPGA) or in a combination of hardware/software.

Figure 5:
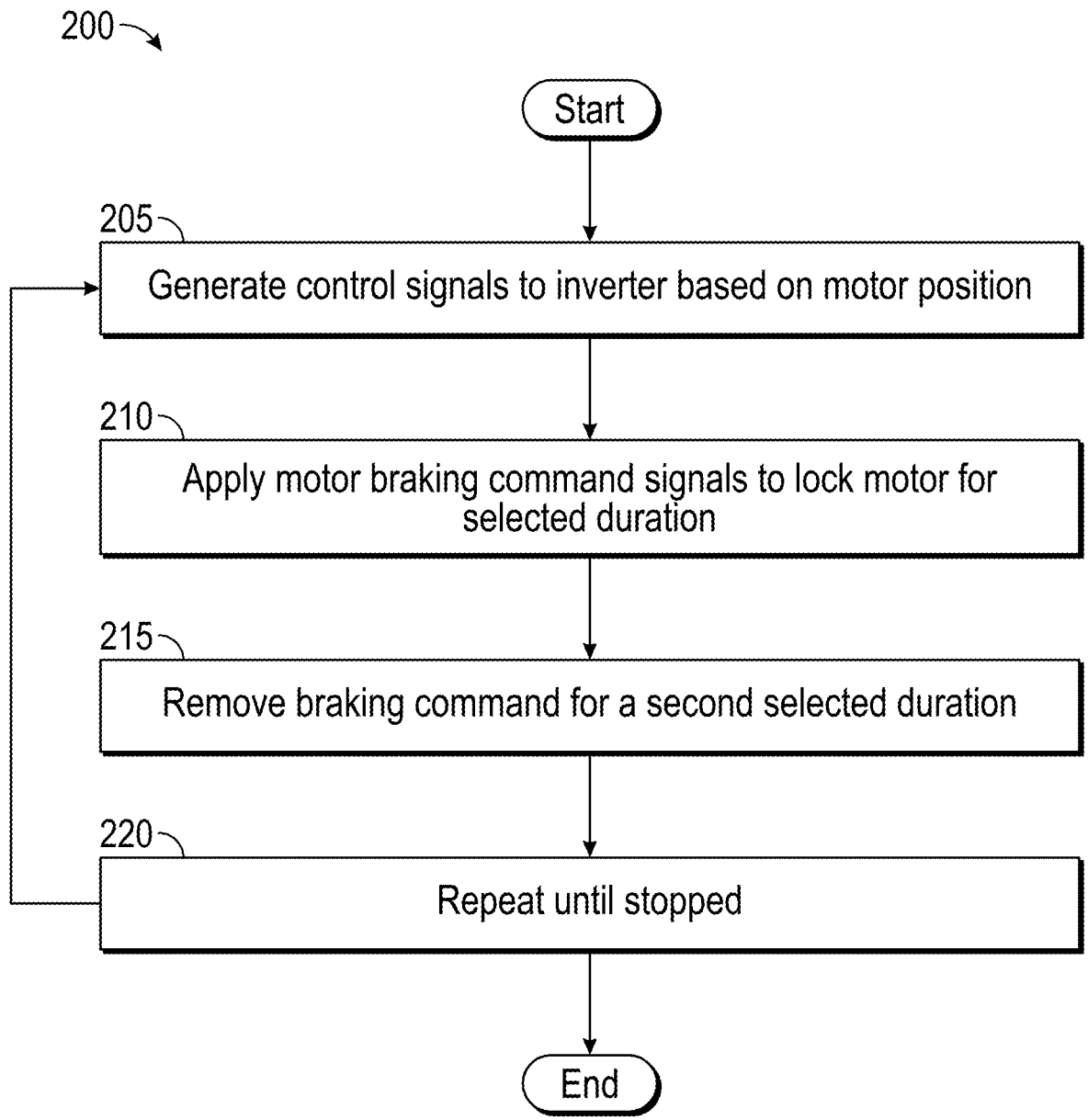
FIG. 5 depicts a flow chart detailing a method of braking the rescue hoist system in accordance with an embodiment.

Turning now to FIG. 5, the operation electromagnetic braking methodology of the hoist system 10 and associated method of controlling the motor 150 is described. Based on the current position of the permanent magnet, the stator coils 152 are excited such that it attracts the rotor. For the three different positions 155, 156 and 157 of the rotor 154 illustrated in the FIG. 4, The Hall sensor H2, H1, and H3 detects south, north and south of the rotor magnets respectively. For these detected positions of rotor 154, the controller 120 generates control signals 122 such that the stator coils A, C and B 152 are excited with excitation signals 144 to create south, north and south poles respectively in the stator thereby attracting the rotor 154 and thus electromagnetic braking is applied by the motor 150. In an embodiment, the described technique involves controlling the motor 150 as a brake under selected operational conditions, for example, under emergency conditions, or any situation when commanded by the operator. In one embodiment, if the conventional mechanical brake 190 (FIG. 2) becomes inoperative, the motor 150 is controlled to operate and act as backup for mechanical brakes 190. During motoring operation, PWM (Pulse Width Modulation) control signals 122 are applied to the switching devices 142 (FIG. 3) of the inverter 140 to generate the AC excitation signals 144 for the motor 150 from the input DC power on the DC bus 134. The PWM control signals 122 are generated in such a way that the electromagnetic field generated by the stator winding 152 of the motor 150 interacts with the magnetic field of the rotor 154 to create a rotating motion. Likewise, for braking operation, the PWM control signals 122 are generated in such a way that the magnetic field generated by the stator winding 152 is configured to magnetically lock with the magnetic field of the permanent magnets in the rotor 154. As a result, the motor 150 is magnetically held in a fixed position and can hold the rotor 154 of motor 150 in its current position. The stator winding 152 consists of three coils namely A, B and C which are 120° apart.

There are several methods of braking the motor 150: dynamic braking; regenerative braking; and plugging type braking. Dynamic braking is bringing the machine to rest position by dissipating the kinetic energy possessed by the motor in the form of heat energy, typically through some external resistance as a load. In regenerative braking, the motor acts as a generator. The direction of the stator current will be reversed and the power is directed back to the source, typically a battery or converter, and the like, thereby braking the motor. Plugging type braking is implemented by reversal to the power supply polarity such that the motor is driven in with the opposite polarity excitation. The reversed or opposing current will have impact on torque of the motor and, thus, produces deceleration.

Application of the brake instantly or too rapidly is also not desirable. The impact on the hoist system 100 and users could be significant. Too rapid an application could cause the cable to slip potentially causing damage to the hoist system 100, payload being carried, or even individuals or property in the vicinity of the payload. Moreover, rapid or sudden braking would be very alarming and could be potentially harmful to a person being rescued, for example if the cable was jerked hard or stopped suddenly. To address these concerns and overcome any potential drawbacks, the braking function as provided by the motor 150 is applied gradually. For example, in an embodiment, as described herein a progressive (iterative, systematic) braking process is described.

FIG. 5 depicts a method 200 employed for progressively braking with the BLDC motor 150 in the hoist system 100 in accordance with an embodiment. In an embodiment, there are two methods of applying the brake progressively. In the first instance, the commutation of excitation to the stator winding is controlled in the direction of the motor spin to dynamically control the motor spin in a conventional fashion. In the second instance, braking is achieved by iteratively applying and removing the excitation to stator windings 152 of the motor 150 such that the braking is realized in cyclic fashion. In an embodiment, the stator coils 152 are excited as mentioned as described above for controlling the motor 150. Further, as needed, to brake the motor 150, the method herein may be employed. Turning now to FIG. 6 as well, at process step 205, an operational characteristic of the motor 150, e.g., the position of the motor rotor 154, is determined based on feed back of the rotor position as sensed by the Hall Effect sensors 160. The Hall Effect sensors 160 provide signals indicative of the rotor's 154 magnetic position. From this data, the controller 120 can determine the magnetic position of the rotor 154. The controller 120 may then generate the PWM control signals 122 to the switching devices 142 of the inverter 140. In turn, the control of the switching devices 12 generates and applies the motor command signals 144 as depicted at process step 210, to each of the stator coils 152 to induce opposing magnetic fields in the stator windings 152 such that the motor 150 becomes magnetically locked momentarily, for example a time t1. Turning now to process step 215, after waiting for a selected first duration t1, for example, a few milliseconds, the excitation is removed, permitting the rotor 154 of the motor to move freely due to the load for a second selected duration t2, again, on the order of milliseconds, for example. Continuing now with process step 220 the braking and non-braking of process steps 205 and 210 is repeated as needed until the motor comes to a gradual smooth stop. For example between 3-5 times such that the motor comes to a gradual stop. The control signals 122 generated by the controller 120 and the signals 144 to excite the stator coils 152 (A, B and C) i.e., t1, t2, and number of cycles as depicted in FIG. 6 are programmable in controller 120. Moreover, it will be appreciated that the braking command signals 144 are configurable whether in hardware or software of controller 120 for a given hoist system 100 configuration, motor 150 or motor structure.

It will be appreciated that in the described embodiments, the control power required to power the processor of controller 120 and other electronic components may be provided by a different source that that employed for driving the motor or other equipment. For example, in an embodiment of an aircraft application, an aircraft essential bus supplies the control power to the hoist system 100 to ensure that the hoist system 100 is powered and available. Thus, even when the motor drive is not available, the control power will ensure that the switching devices 142 of the inverter 140 are operated in such a way that it creates a closed path and dissipates energy in the motor stator windings 152 to provide braking. Effectively, control power to the hoist system 100, and at least the braking portion of it is always ensured through the aircraft essential bus. Hence there is no interruption/safety issue even if input power to the motor is lost during operation.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one more other features, integers, steps, operations, element components, and/or groups thereof.

The corresponding structures, materials, acts, and equivalents of all means or step plus function elements in the claims below are intended to include any structure, material, or act for performing the function in combination with other claimed elements as specifically claimed. The description of the present invention has been presented for purposes of illustration and description, but is not intended to be exhaustive or limited to the invention in the form disclosed. Many modifications and variations will be apparent to those of ordinary skill in the art without departing from the scope and spirit of the invention. The embodiment was chosen and described in order to best explain the principles of the invention and the practical application, and to enable others of ordinary skill in the art to understand the invention for various embodiments with various modifications as are suited to the particular use contemplated.

The invention claimed is:

1. A permanent magnet (PM) motor driven hoist with motor based electromagnetic braking comprising:
    a direct current (DC) power source;
    a PM motor having stator coils and a PM rotor operably coupled to a cable drum with a cable wrapped thereon; and
    a controller operably connected to the direct current power source and the PM motor, wherein the controller is configured to control the PM motor employing a method to brake the PM motor comprising;
       generating control signals in the controller based on a position of the PM motor,
       applying a braking command signal to the PM motor to magnetically lock the PM rotor of the PM motor for a selected duration,
       removing the braking command signals for a second selected duration, and
       repeating the generating control signals, applying a braking command signal and removing the braking command signal until the PM motor has stopped.

2. The hoist of claim 1, further including a gear train operably coupled to the PM motor and the cable drum.

3. The hoist of claim 1, further including an electromechanical brake operably coupled to the controller and the cable drum.

4. The hoist of claim 3, wherein the electromechanical brake is energized when the PM motor is not commanded to move by the controller.

5. The hoist of claim 3 wherein the electromechanical brake is energized when the PM motor is commanded to move by the controller.

6. The hoist of claim 3, wherein the electromechanical brake is configured to arrest the motion of the cable drum and hold the cable drum in a fixed position under selected conditions.

7. The hoist of claim 1, further including a plurality of Hall effect sensors configured to detect the position of a rotor of the PM motor.

8. The hoist of claim 1, wherein the PM motor is at least one of a brushless direct current BLDC motor, a Permanent Magnet Synchronous Motor and a Reluctance motors.

9. The hoist of claim 1, wherein the controller includes an inverter for generating command signals to the PM motor.

10. The hoist of claim 9, wherein the inverter includes at least six switching devices arranged in three legs.

11. The hoist of claim 1, wherein the braking command signals are pulse width modulated (PWM) based on an operational characteristic of the PM motor.

12. The hoist of claim 1, wherein the braking command signals are configurable for a given hoist configuration.

13. A method of applying a brake in a hoist system with an permanent magnet (PM) motor operably connected to a cable drum with a cable wrapped thereon, a controller operably connected the PM motor and a direct current power source, the controller executing the method comprising:
    generating control signals in the controller based on a position of the PM motor;

applying a braking command signals to the PM motor to magnetically lock the PM motor for a selected duration;

removing the braking command signals for a second selected duration; and repeating the generating, applying and removing until the PM motor has stopped.

14. The method of claim 13, further including energizing an electromechanical brake when the PM motor is not commanded to move by the controller, wherein the electromechanical brake is configured to arrest the motion of the cable drum and hold the cable drum in a fixed position under selected conditions.

15. The method of claim 13, further including energizing an electromechanical brake when the PM motor is commanded to move by the controller, wherein the electromechanical brake is configured to arrest the motion of the cable drum and hold the cable drum in a fixed position under selected conditions.

16. The method of claim 13, wherein the braking command signals are pulse width modulated (PWM) based on an operational characteristic of the PM motor.

17. The method of claim 13, wherein the braking command signals are configurable for a given hoist configuration.

* * * * *